US006998818B2

(12) United States Patent
Xiong et al.

(10) Patent No.: US 6,998,818 B2
(45) Date of Patent: Feb. 14, 2006

(54) CHARGING CIRCUIT WITH TWO LEVELS OF SAFETY

(75) Inventors: Seng P. Xiong, Dacula, GA (US); Martin H. Ramsden, Lawrenceville, GA (US); Marc B. Riley, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 347 days.

(21) Appl. No.: 10/429,070

(22) Filed: May 3, 2003

(65) Prior Publication Data

US 2005/0168193 A1 Aug. 4, 2005

(51) Int. Cl.
*H02J 7/00* (2006.01)

(52) U.S. Cl. ....................... 320/134; 320/145; 320/160

(58) Field of Classification Search ................ 320/145, 320/149, 134, 141, 160

See application file for complete search history.

(56) References Cited

U.S. PATENT DOCUMENTS 5,982,151 A * 11/1999 Nagai et al. ................ 320/141
5,998,966 A * 12/1999 Gaza .......................... 320/116
5,998,968 A * 12/1999 Pittman et al. ............. 320/130
6,037,750 A * 3/2000 Von Novak ................. 320/132
6,316,956 B1 11/2001 Oglesbee
6,674,147 B2 * 1/2004 Sakamoto .................. 257/560

* cited by examiner

*Primary Examiner*—Michael Sherry
*Assistant Examiner*—Robert Grant
(74) *Attorney, Agent, or Firm*—Hisashi D. Watanabe

(57) ABSTRACT

A battery charging circuit having two levels of safety protection is provided. The circuit is said to have “two levels” of safety because if any one component fails (either as a short circuit or as an open circuit) the remainder of the charging circuit ensures that a rechargeable battery coupled to the circuit will not be overcharged. The circuit includes both hardware and firmware protection components, with a microprocessor providing the firmware protection. Overvoltage protection, voltage regulation and current regulation are provided, along with a microprocessor capable of sensing a plurality of voltages across the circuit. The overvoltage protection, voltage regulator and current regulator each include safety actuation points. In parallel, the microprocessor may isolate a rechargeable battery from the cell if voltage and current minimums and maximums are exceeded. The microprocessor further is able to isolate the battery from the circuit if the power dissipation in the voltage regulator, the current regulator or the overall charging circuit is exceeded, provided the microprocessor has decremented current to a minimum level.

4 Claims, 10 Drawing Sheets

CHARGING CIRCUIT WITH TWO LEVELS OF SAFETY

BACKGROUND

1. Technical Field

This invention relates generally to battery charging systems, and more particularly to a battery charging system capable of protecting a battery cell despite the failure of any single component.

2. Background Art

Battery chargers are inherently complex systems. While some may think that all a battery charger does is "dump" current from a wall outlet into a rechargeable cell, nothing is farther from the truth. In addition to power conversion and filtering, charging systems offer safety protection to ensure that batteries are not overcharged. Some charging systems include other features like fuel gauging as well.

Safety is a very important issue for battery chargers. Common prior art battery chargers generally contain an AC-DC power converter, like a flyback power supply, and various serial voltage filtering and current limiting components that ensure the rechargeable battery is not overcharged. A common problem with these systems occurs when one of the serial components fails. For example, assume a battery charger includes an AC-DC converter (which converts 120V AC from the wall to 5V DC), and a serial current limiting circuit. If the current limiting circuit (which is often a transistor operating in its linear range) fails in a shorted condition, the battery may become overcharged, potentially venting combustible gasses.

The common solution to this component failure problem is to simply add redundant components. If there is one serial current regulator, add another. If there is one voltage regulator, add another. By doubling all safety components, two component failures are required to compromise the safety of the charger. The problem with doubling components, however, is cost. Doubling each of the components essentially doubles the overall cost of the charger.

There is thus a need for an improved battery charger that can sustain a component failure anywhere in the circuit without compromising charger reliability.

DETAILED DESCRIPTION OF THE INVENTION

Figure 1:
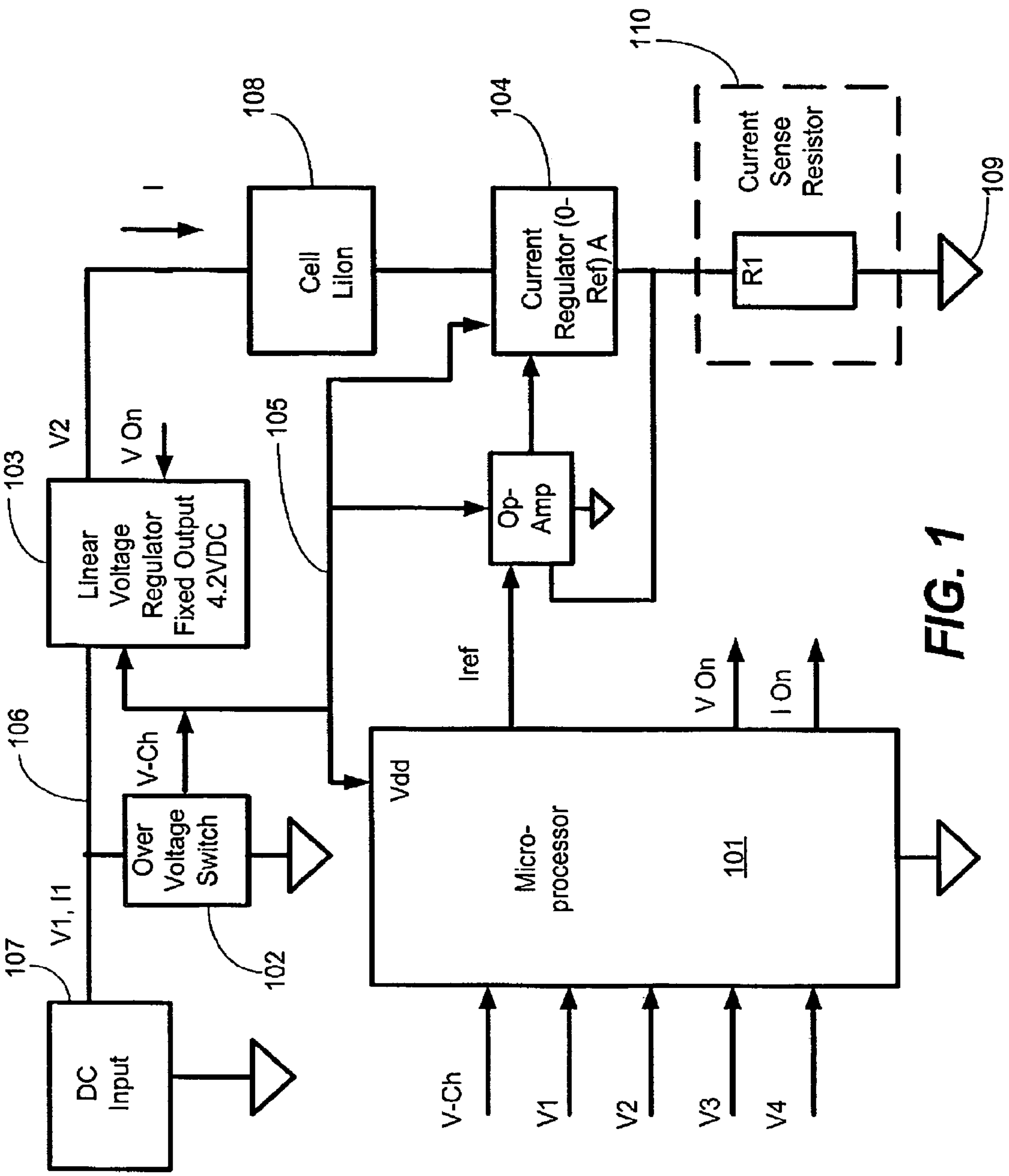
FIG. 1 illustrates a block diagram of a charging circuit having two levels of safety in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a block diagram of a charging circuit having two levels of safety in accordance with the invention. The circuit is said to have "two levels" of safety because if any one component fails (either as a short circuit or as an open circuit) the remainder of the charging circuit ensures that a rechargeable battery coupled to the circuit will not be overcharged, and further ensures that the reliability of the other circuit components will not become compromised. (I.e. one circuit failure will not cascade, thereby causing a total system failure.) In other words, two components would need to fail simultaneously before any unrequested current surplus reached the battery.

The two levels of safety are provided by hardware and firmware working in tandem. The hardware of the circuit has fault mechanisms to protect the cell. The firmware, which is embedded code stored in a memory device (either on-board memory in the microprocessor or an independent memory IC) running on the microprocessor 101, constantly monitors both the hardware and circuit voltages and currents to detect faults. If any abnormal condition appears, be it due to a hardware fault or an external stimulus, the firmware steps through a series of safety precautions to ensure battery safety.

From a descriptive standpoint, it is probably simplest to examine each layer of protection (i.e. the hardware, signal monitoring firmware, and power monitoring firmware) independently. Once the basics of each layer are understood, the synthesis of hardware and firmware will become apparent, forming the circuit with two layers of safety.

The hardware component comprises overvoltage protection 102, voltage regulation 103, current regulation 104 and a microprocessor 101 for monitoring each hardware element. The overvoltage protection 102 is a hardware lockout circuit that has a master enable signal 105 coupled to both the voltage regulator 103 and the current regulator 104. When the input voltage 106 provided by a DC source 107 exceeds a predetermined threshold, the overvoltage protection 102 actuates. This actuation causes both the voltage regulator 103 and current regulator 104 to open, thereby protecting the battery 108 from either overcharge or other problematic conditions, like an overvoltage state for example.

For example, common, off the shelf lithium ion protection circuits, like those manufactured by Seiko for example, typically have a maximum operating voltage of 20V DC. In a single cell, lithium application, the predetermined threshold of the overvoltage protection circuit may be set somewhere just below this level, like 18V. When the input voltage 106 exceeds 18V, the overvoltage protection 102 would cause both the voltage regulator 103 and the current regulator 104 to open, thereby isolating the battery cell from the input voltage 106.

In addition to the input voltage 106 being too high, it may also be too low. When it is too low, the microprocessor 101 will decrement the current by a predetermined amount in an effort to determine whether the DC source 107 is being overloaded. If the input voltage 106 does not rise to an acceptable level, the microprocessor 101 will open the voltage regulator 103 and current regulator 104, thereby isolating the battery 108 from the source 107.

For example, in a single, lithium cell application, the source needs to be at least 4.2V DC, which is a typical charge termination voltage. If the input voltage 106 is less than the required 4.2V, the microprocessor 101 will decrement the current. If the charging current was set to say, 1 A, the microprocessor 101 might decrement the current by 100 mA every few seconds in an attempt to find a power point that could be supplied by the source 107. If the input voltage fails to reach the 4.2V when the microprocessor 101 had decremented the current to a minimum value, like 100 mA, the microprocessor would open the voltage regulator 103 and the current regulator 104.

Next, turn to the voltage regulator 103. This component can fail in two ways: open and short. If the voltage regulator 103 fails as a short, the input voltage 106 passes to the battery 108. However, the current flowing through the battery 108 is limited by the current regulator 104, thereby protecting the battery 108. Additionally, the input voltage 106 is assured to be below the safety circuit within the battery 108, due to the fact that the overvoltage protection 102 has not actuated. Thus, the battery 108 is safe when the voltage regulator 103 fails as a short. When the voltage regulator 103 fails as an open, the battery 108 is isolated from the input voltage 106. Again, this is a safe situation for the battery 108.

Likewise, the current regulator 104 can fail in either an open or shorted mode. (The effects of a failed current sense resistor 110 are the same as those for a failed current regulator 104.) When open, the return path 109 to the source 107 opens. Thus the battery 108 is isolated from the source 107, which is a safe condition.

When the current regulator 104 fails as a short, the voltage regulator 103 continues to limit the voltage seen by the battery 108 to a predetermined level, like 4.2 volts for a single cell, lithium application. In this situation, the worst case current flowing through the battery 108 occurs when the battery 108 is fully discharged. Due to the internal impedance of the battery 108, however, this current is not high enough to damage the battery 108. Hence, the battery is again safe.

If the microprocessor 101 fails, the battery is still protected by the voltage regulator 103, the current regulator 104, and the overvoltage protection 102. The only "battery damaging" things that may occur when the microprocessor 101 is not functional are too much input voltage and too little input voltage. However, too little input voltage 106 will not damage the battery 108. (It may discharge the battery 108, but no damage will occur.) The overvoltage protection 102 prevents too much input voltage 106 from damaging the battery 108.

Figure 2:
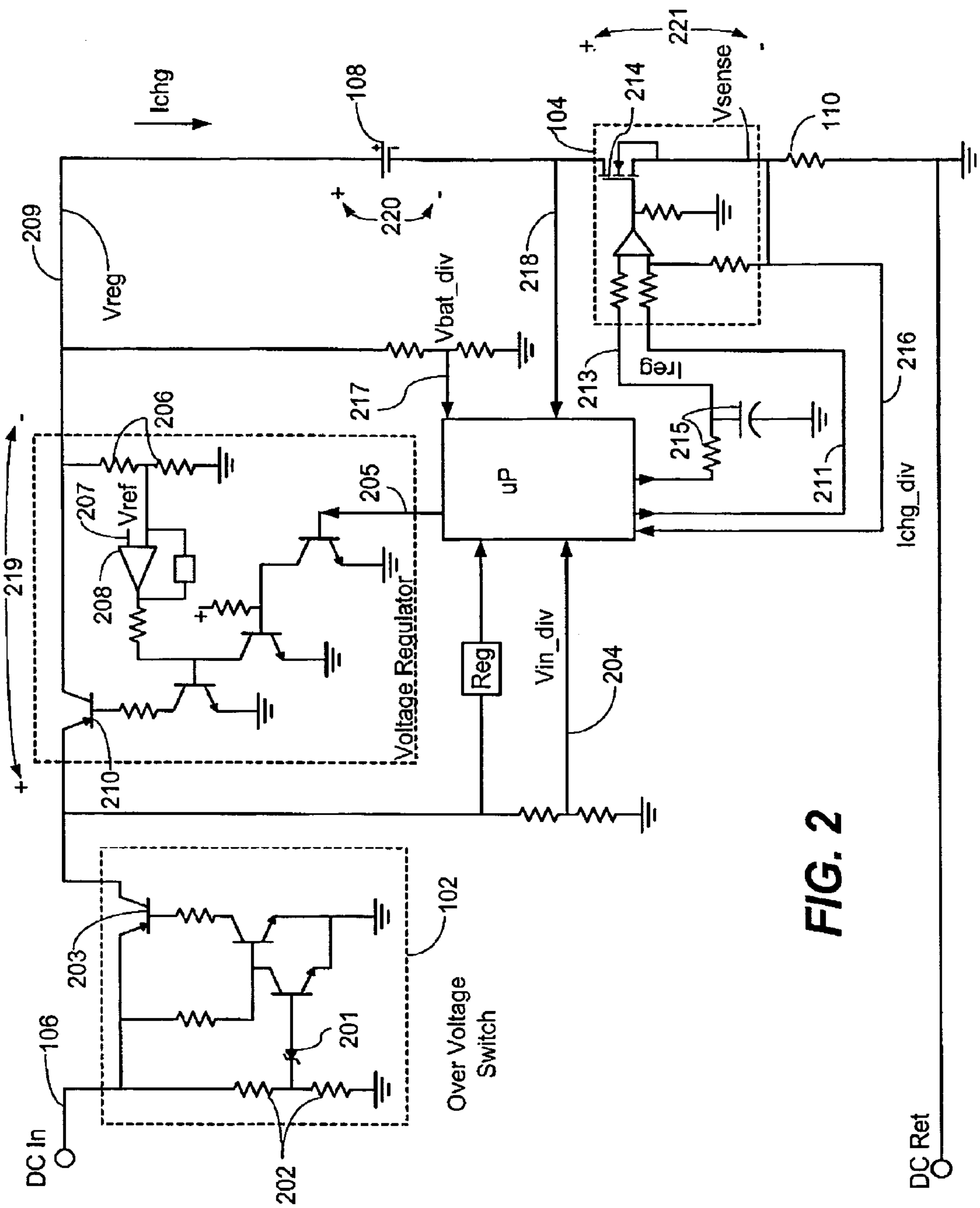
FIG. 2 illustrates a schematic diagram of one preferred embodiment of a circuit in accordance with the block diagram of FIG. 1.

Referring now to FIG. 2, illustrated therein is a schematic diagram of one preferred embodiment of a circuit in accordance with the block diagram of FIG. 1. The blocks of FIG. 1, including the overvoltage protection 102, the voltage regulator 103, the current regulator 104, the battery 108, the current resistor 110, and the microprocessor 101 are shown. An exemplary circuit embodiment is given for each block.

The overvoltage protection 102 centers about a zener diode 201 that is coupled through a resistor divider 202 to the input voltage 106. When the voltage across the zener diode 201 exceeds a threshold set by the resistor divider 202 and the reverse breakdown voltage of the zener diode, a serial transistor 203 turns off, preventing power from passing to the other elements in the circuit. Note that when power is not present at the voltage regulator 103 or current regulator 104, they default to an open state. Note also that the microprocessor 101 senses a scaled input voltage. In so doing, the designer may include an input voltage sense in firmware that is slightly below the hardware trip point set by the zener diode 201.

In one preferred embodiment, the voltage regulator 103 is a conventional linear regulator that is driven by a voltage regulator enable signal 205 from the microprocessor 101. When the voltage regulator enable signal 205 is active, the voltage regulator 103 maintains a regulated voltage 209 set by a reference voltage 207 and a resistor divider 206. When the voltage regulator enable signal 205 is not active, the pass element 210 of the voltage regulator 103 turns off, thereby isolating the battery 108 from the input voltage 106. The microprocessor may deactivate the voltage regulator enable signal 205 for any of a variety of conditions, including when the voltage regulator 103 is not regulating properly, or when the power dissipation across the voltage regulator 103 is too high. Referring to the firmware voltage sense in the preceding paragraph, since the microprocessor 101 senses a scaled input voltage 204, the microprocessor may be programmed to turn off the pass element 210 when the input voltage 106 exceeds the firmware voltage sense. In so doing, the microprocessor 101 would isolate the battery 108 from the input voltage 106 prior to actuation of the overvoltage protection 102.

The current regulator 104 works in similar fashion to the voltage regulator 103, in that it depends upon a current enable signal 211 for operability. When the current regulator enable signal 211 is active, the current regulator 104 maintains a regulated current 212 set by a reference signal 213. When the current regulator enable signal 211 is not active, the pass element 214 of the current regulator 104 turns off, thereby isolating the battery 108 from the input voltage 106. Like with the voltage regulator 103, the microprocessor may deactivate the current regulator enable signal 211 for any of a variety of conditions, including when the current regulator 104 is not properly regulating current, or when the power dissipation across the current regulator 104 is too high.

The reference signal 213 is variable by the microprocessor 101, so the microprocessor may vary the current flowing through the battery 108. The reference signal 213 is preferably a pulse-width-modulated signal generated by the microprocessor 101 and converted to an average value by a R-C filter 215, although other signals, like digital to analog voltages may be equally used. The microprocessor 101 monitors current by way of a current sense line 216.

Turning now to the firmware protection, note that the circuit of FIG. 2 provides numerous voltage sense points for the microprocessor 101. (Note that while some microprocessors include multiple A/D inputs, others may require peripheral components like A/D converters, multiplexers and the like.) The microprocessor 101 senses the input voltage 106 by way of the scaled input voltage 204, the regulated voltage 209 by way of the scaled regulated voltage 217, the voltage between the battery 108 and the current regulator 104 by way of node 218, and the voltage between the current sense resistor 110 and the current regulator 104 by way of the current sense line 216. In so doing, the microprocessor 101 may calculate the voltage across the voltage regulator 219 (by subtracting the voltage at node 209 from that at node 204), the voltage across the cell 220 (by subtracting the voltage at node 218 from that at node 209), the voltage across the current regulator 221 (by subtracting the voltage at node 216 from that at node 218), and the current 212 by taking the current sense line voltage 216 and dividing it by the value of the current sense resistor 110.

The microprocessor 101 may also calculate power dissipation of the following: across the circuit (by multiplying the input voltage 106 by the current sense line voltage 216 divided by the value of the current sense resistor 10); across the voltage regulator 103 (by multiplying the voltage across the voltage regulator 219 by the current 212); and across the current regulator 104 (by multiplying the voltage across the current regulator 221 by the current 212).

Armed with the current, the plurality of voltages and plurality of power dissipations, the microprocessor 101 may be programmed to enhance the safety of the already robust hardware to form a charging circuit with two levels of safety.

The microprocessor provides a first level of firmware protection based upon the voltages and currents. The power dissipation values provide a second level of firmware protection. The table below most succinctly illustrates these levels of firmware protection:

TABLE 1

Figure 3:
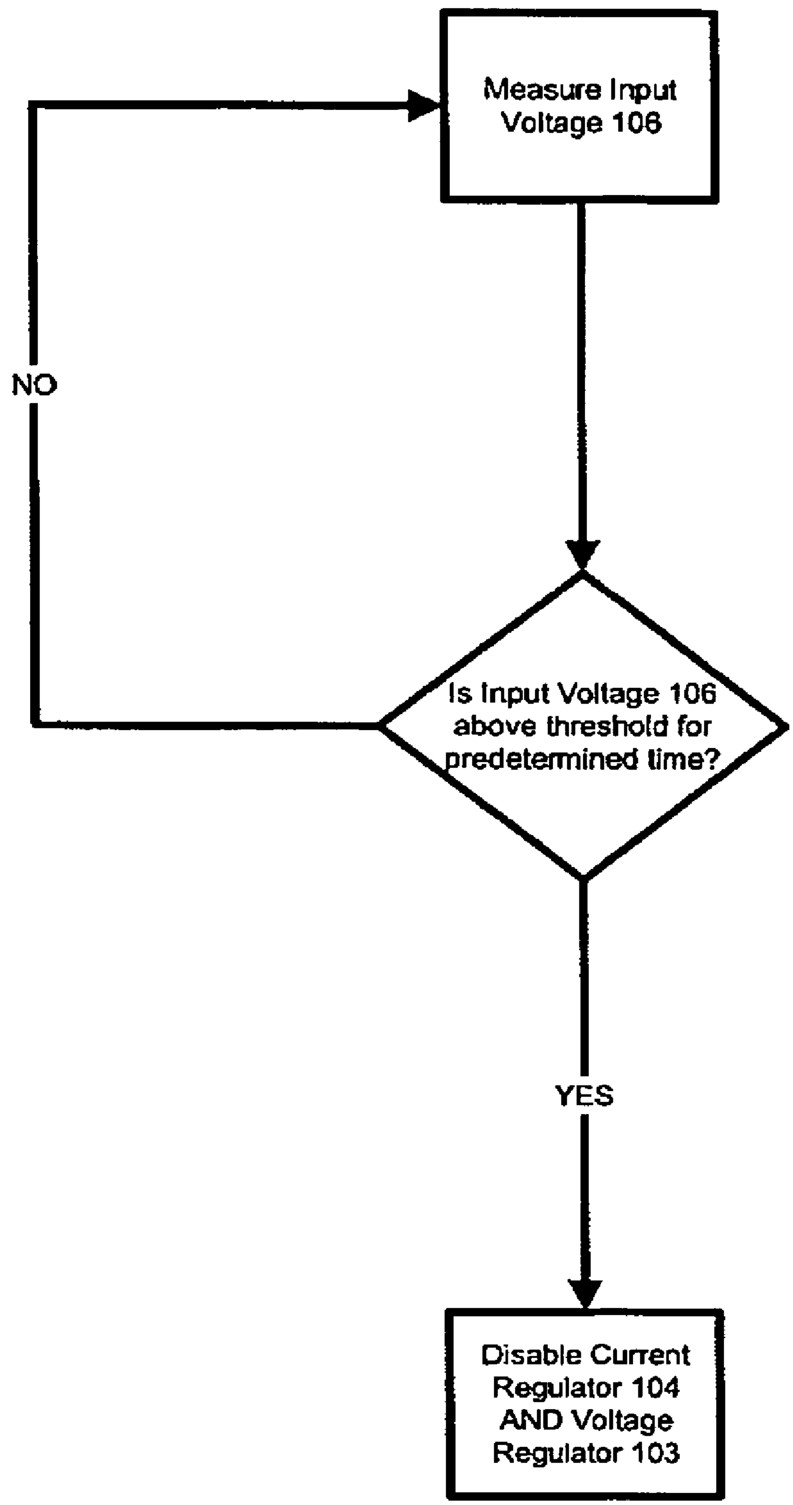
FIGS. 3–10 are included to satisfy the requirements of 37 CFR 1.83, despite being recited in Table 1.
Figure 4:
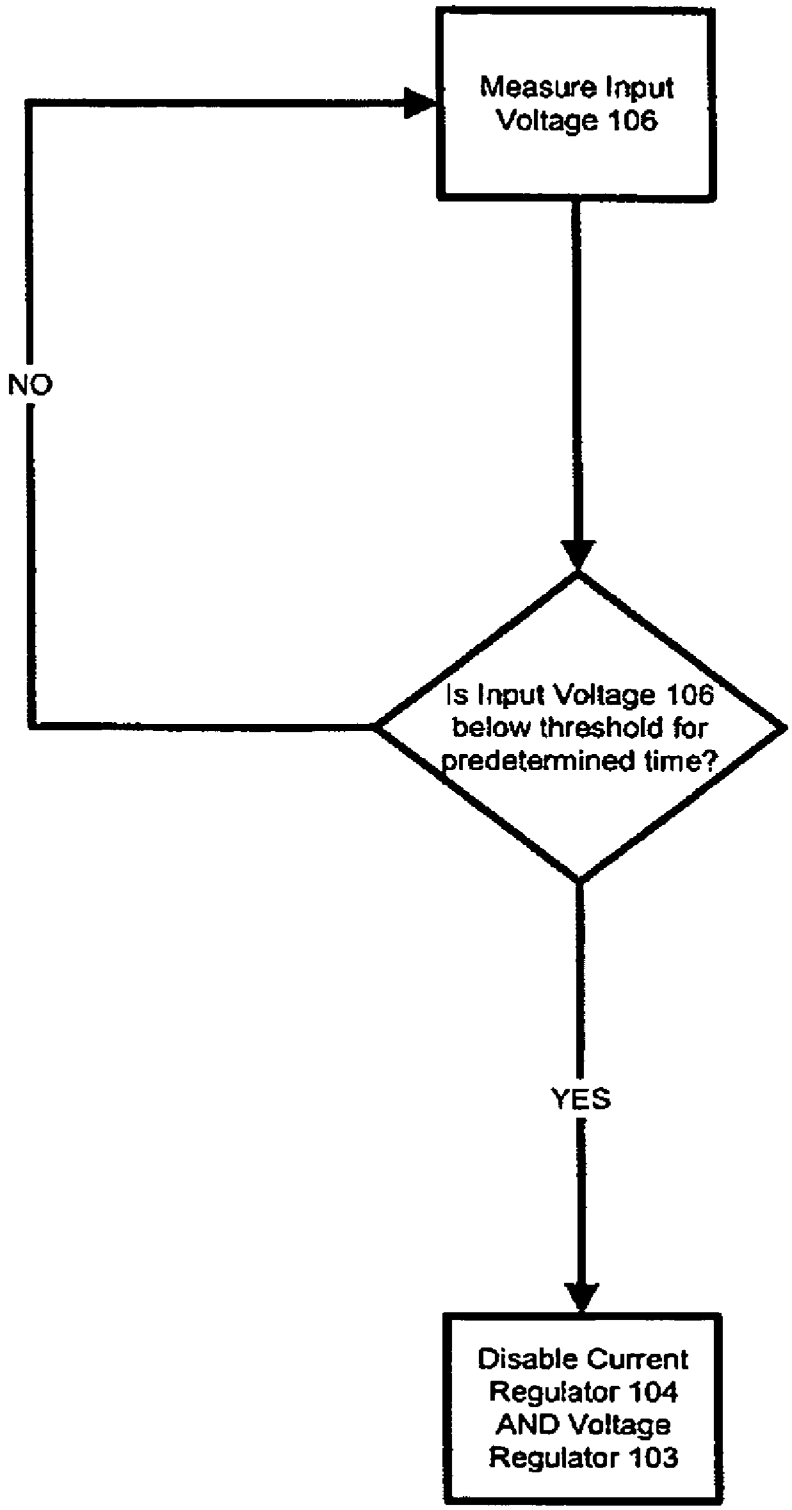
Figure 5:
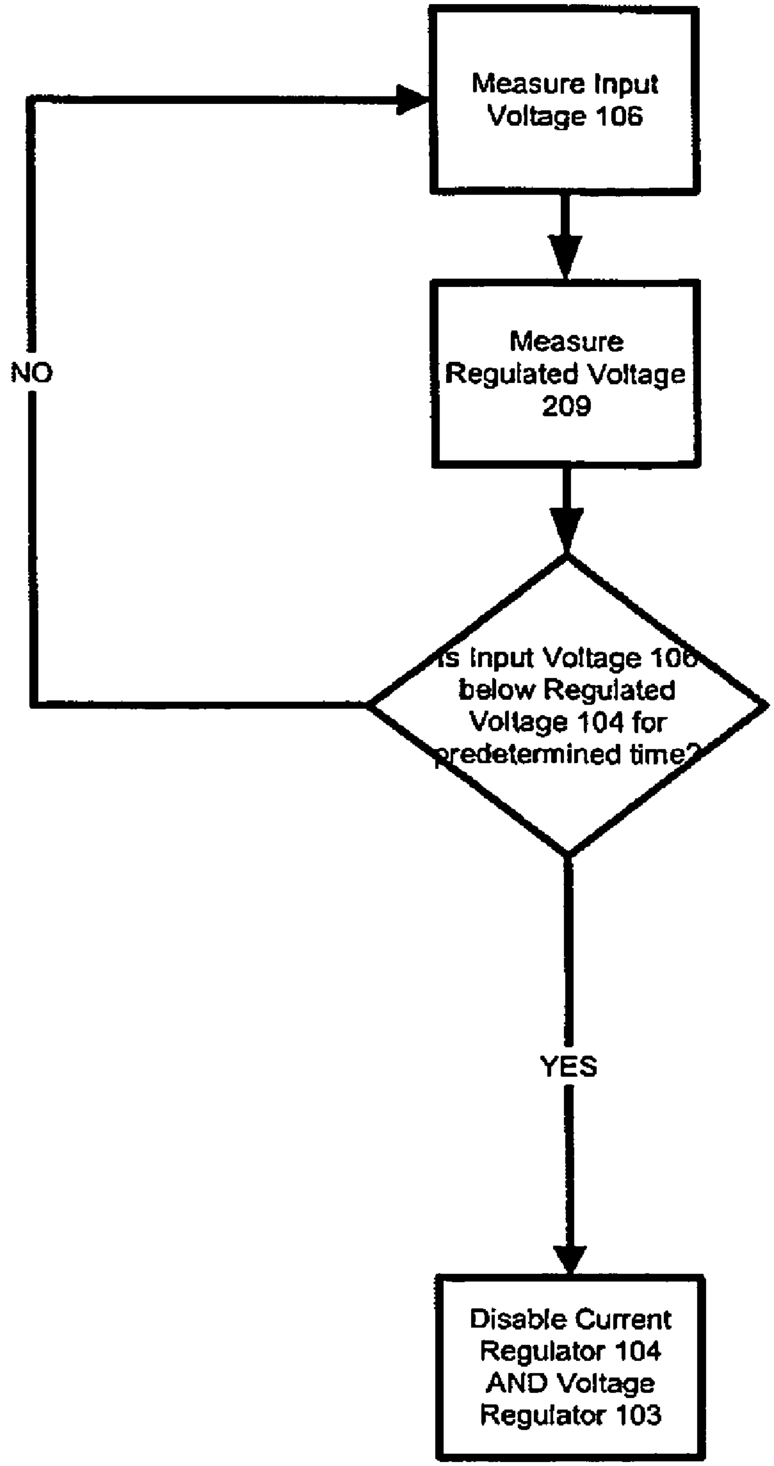
Figure 6:
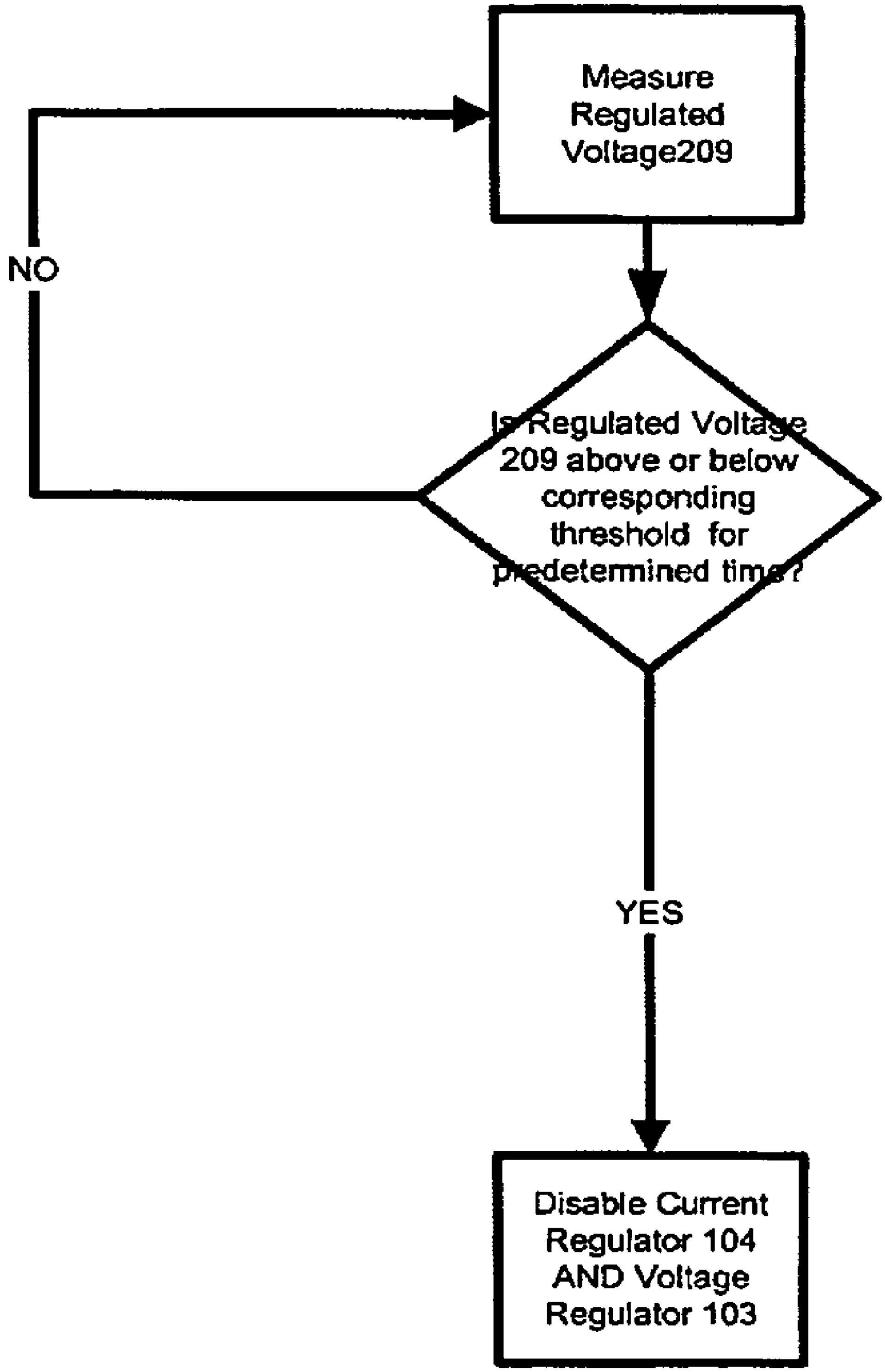
Figure 7:
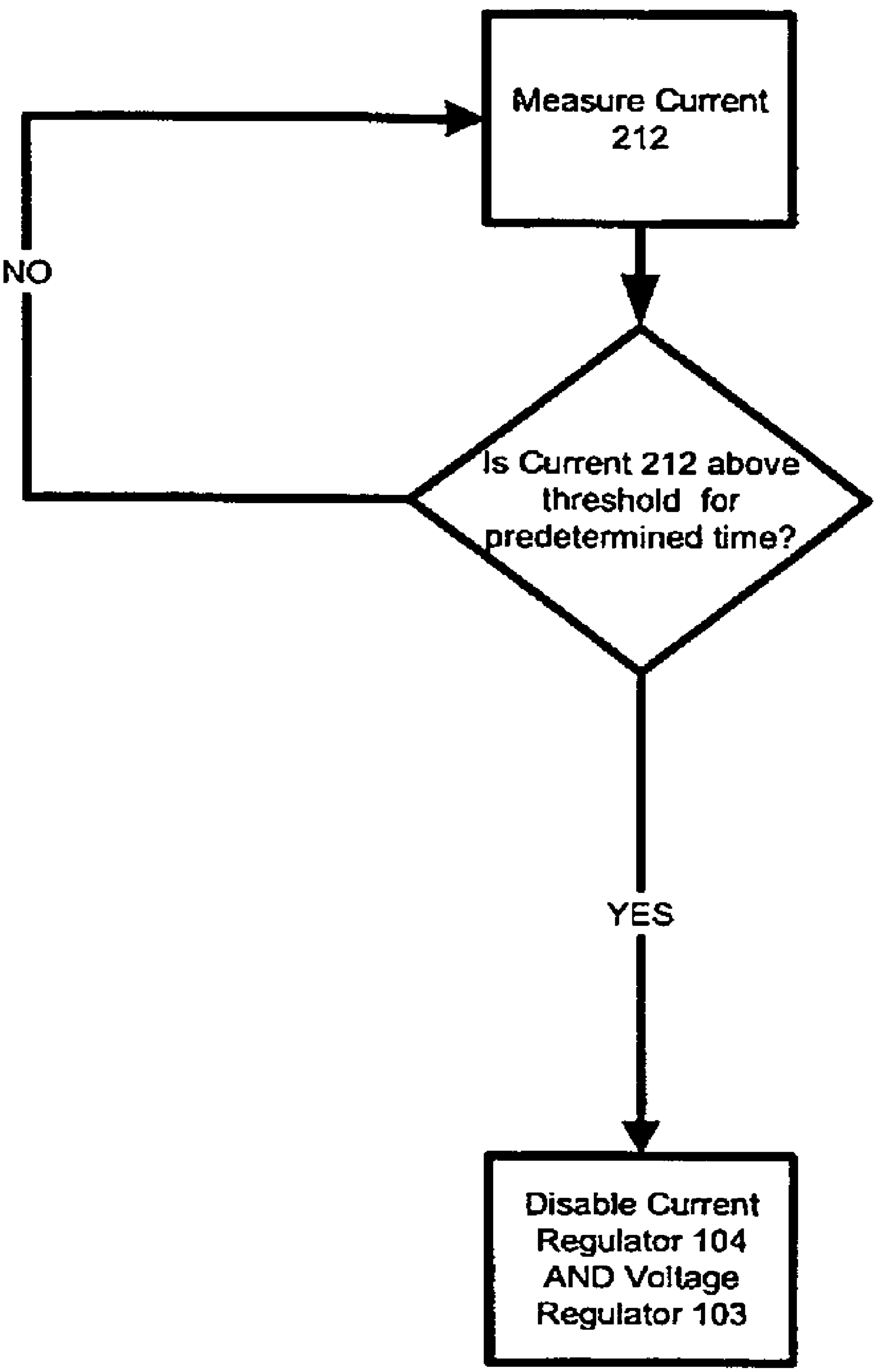
Figure 8:
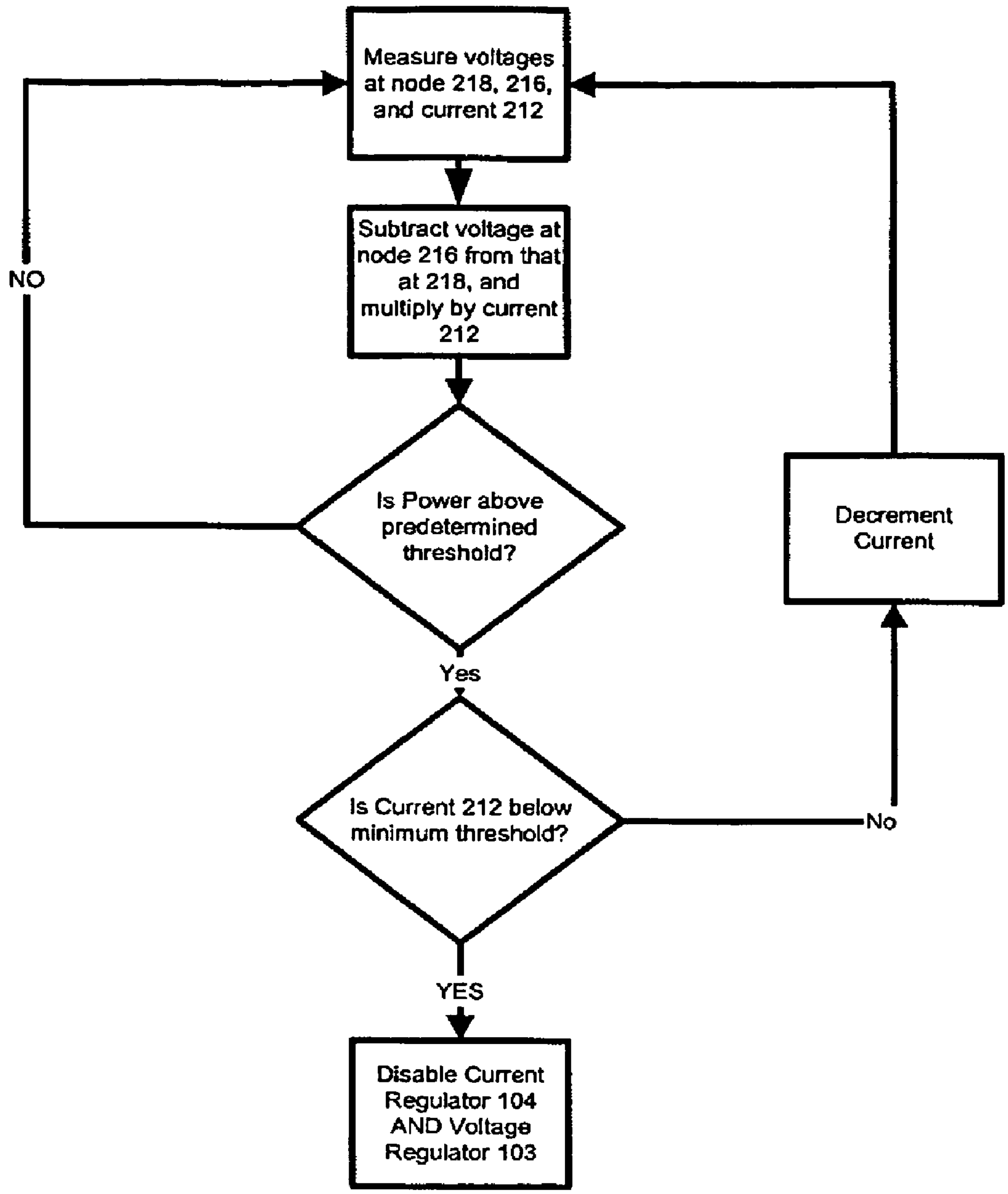
Figure 9:
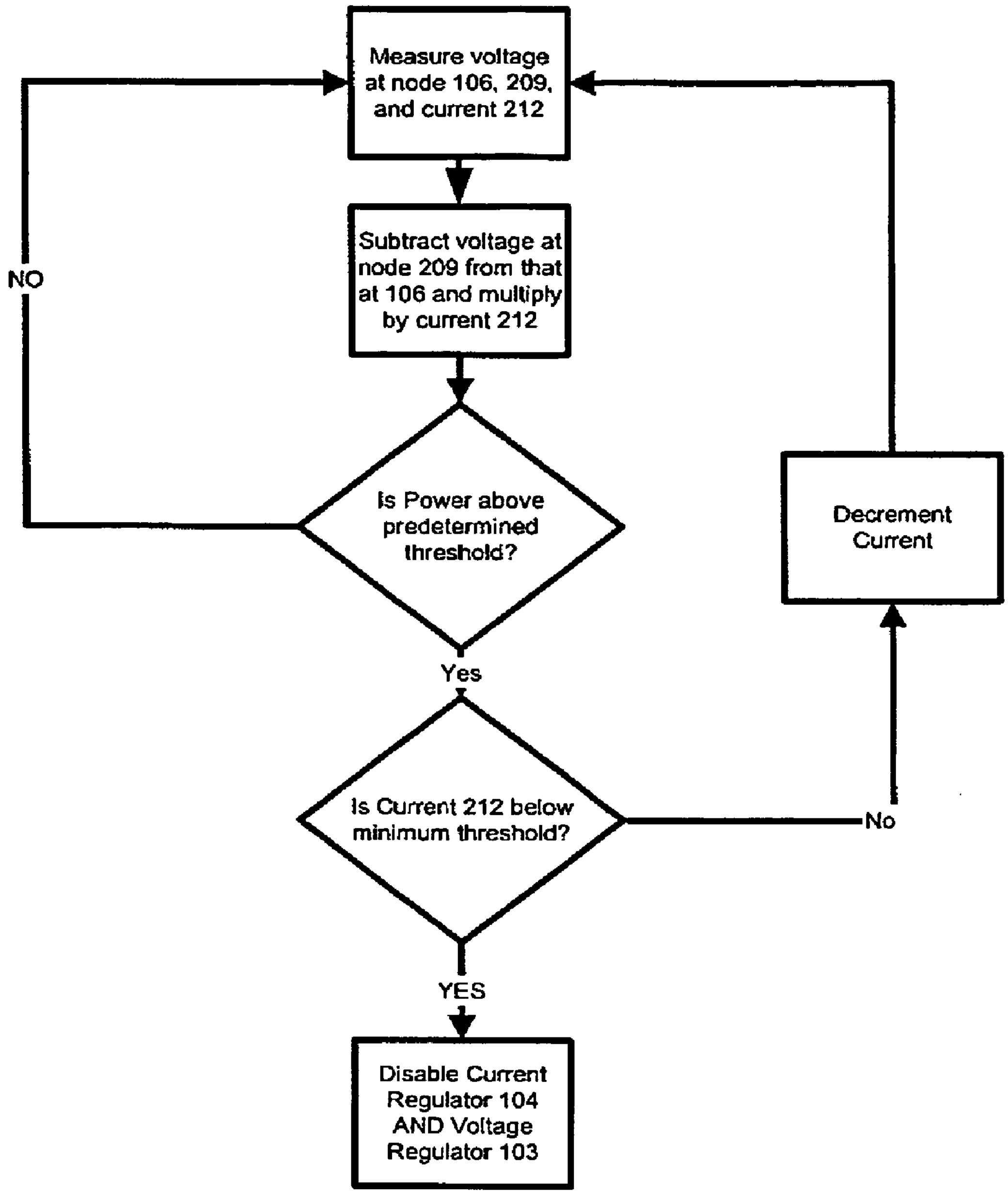
Figure 10:
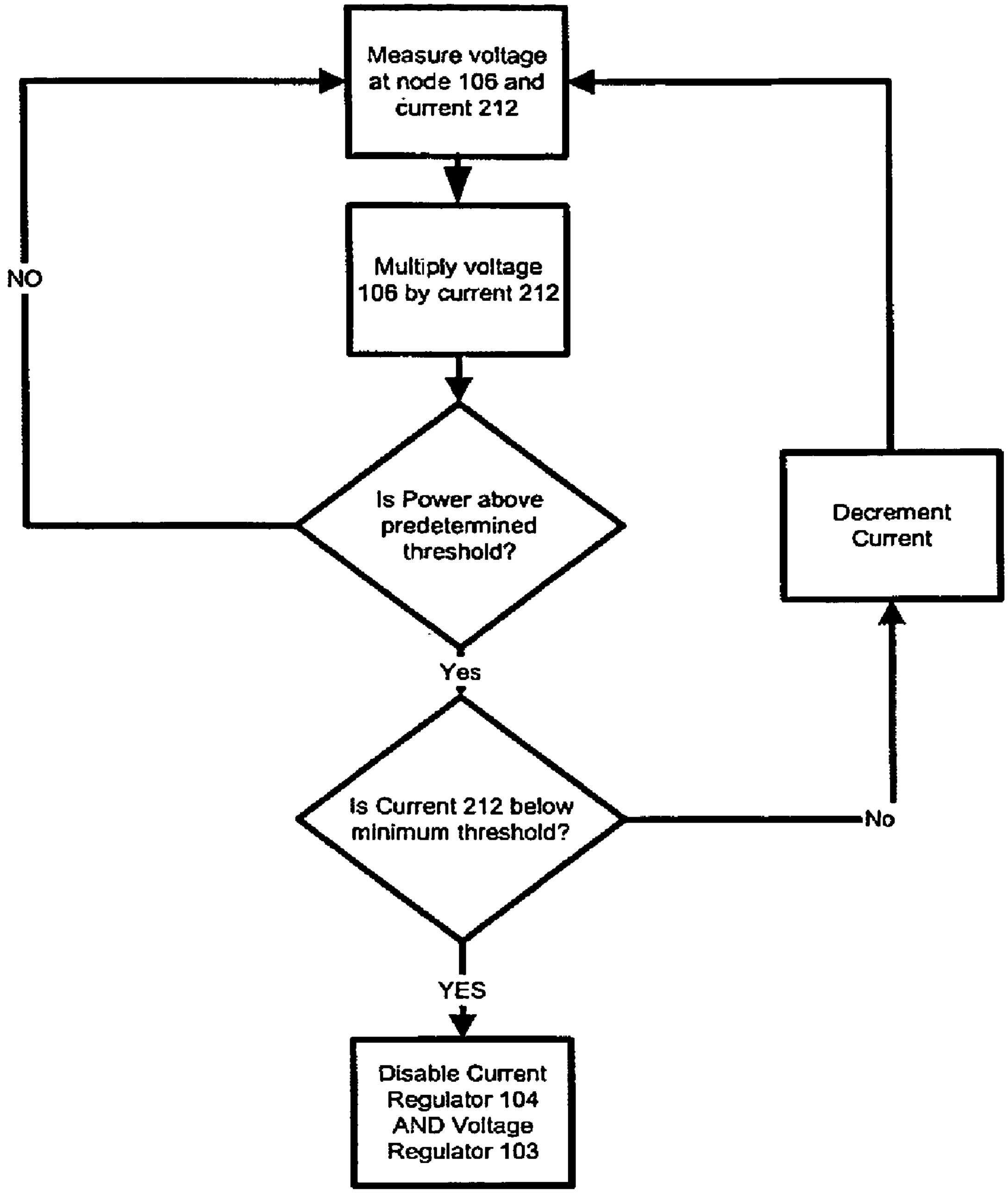

| Problem | Illustration for 37 CFR 1.83 | Possible Cause | Microprocessor Response |
|---|---|---|---|
| Input Voltage 106 exceeds predetermined maximum input voltage (e.g. 17 V DC) threshold for a predetermined time (e.g. 5 seconds) | FIG. 3 | Inappropriate Power Source; Hardware Error | Microprocessor 101 will disable both Current Regulator 104 and Voltage Regulator 103 |
| Input Voltage 106 falls below predetermined minimum input voltage (e.g. 4.75 DC) for a predetermined time (e.g. 5 seconds) | FIG. 4 | Inappropriate Power Source; Hardware Error | Microprocessor 101 will disable both Current Regulator 104 and Voltage Regulator 103 |
| Input Voltage 106 falls below Regulated Voltage 209 for a predetermined time (e.g. 5 seconds) | FIG. 5 | Inappropriate Power Source; Power Source Removed; Hardware Error | Microprocessor 101 will disable both Current Regulator 104 and Voltage Regulator 103 |
| Regulated Voltage falls below a minimum predetermined threshold (e.g. 4.0 V DC) or rises above a predetermined maximum threshold (e.g. 4.4 V DC) for a predetermined time (e.g. 5 seconds) | FIG. 6 | Hardware Error; Short across voltage regulator. Hardware regulation loop error. | Microprocessor 101 will disable both Current Regulator 104 and Voltage Regulator 103 |
| Current 212 exceeds a predetermined threshold (e.g. 1100 mA) for a predetermined time (e.g. 5 seconds) | FIG. 7 | Hardware Error; Shorted current regulator; Current regulation loop error. | Microprocessor 101 will disable both Current Regulator 104 and Voltage Regulator 103 |
| Power Dissipation in Current Regulator 104 exceeds a predetermined threshold (e.g. 1 W), while the requested current 212 falls below a predetermined threshold (e.g. 100 mA) | FIG. 8 | Wrong Power Source Short across voltage regulator; Hardware regulation loop error; Shorted current regulator; Current regulation loop error. | Microprocessor 101 will disable both Current Regulator 104 and Voltage Regulator 103 |
| Power Dissipation in Voltage Regulator 103 exceeds a predetermined threshold (e.g. 1 W), while the requested current 212 falls below a predetermined threshold (e.g. 100 mA) | FIG. 9 | Wrong Power Source; Hardware error. Short across voltage regulator; Hardware regulation loop error. Shorted current regulator. Current regulation loop error. | Microprocessor 101 will disable both Current Regulator 104 and Voltage Regulator 103 |
| Total Power Dissipation exceeds a predetermined threshold (e.g. 4.0 W for 4.5 W power supply to keep the supply from being overloaded) and the requested Current 212 falls below a predetermined threshold (e.g. 100 mA) | FIG. 10 | Wrong Power Source; Short across voltage regulator. Hardware regulation loop error. Shorted current regulator. | Microprocessor 101 will disable both Current Regulator 104 and Voltage Regulator 103 |

Note that current limits are included with the power thresholds in Table 1 because the microprocessor 101 will first try to decrement current (by adjusting the current regulation signal 213) when any of the aforementioned power thresholds have been reached. For example, if the power dissipation across the voltage regulator is 1.5 W, and the current 212 is 500 mA, the microprocessor 101 will decrement the current 212 in predetermined intervals (like 100 mA, for example) until the current 212 reaches a predetermined minimum threshold, like 100 mA. If the power dissipation has not dropped below the maximum threshold (1.0 W for this exemplary case) when this minimum current threshold has been reached, the microprocessor will open both the current regulator 104 and the voltage regulator 103, thereby isolating the battery 108 from the input voltage 106.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while many of the exemplary thresholds used herein are for single cell, lithium applications, it will be clear to those of ordinary skill in the art that these numbers may be varied for multiple cells or cells of alternative chemistry.

What is claimed is:

1. A battery charging circuit, comprising:

a. input terminals for receiving an input voltage and an input current;

b. an overvoltage protection circuit;

c. a voltage regulation circuit having an output voltage;

d. a current regulation circuit;

e. a means for sensing current flowing through the charging circuit, wherein the means for sensing current comprises a resistor;

f. battery terminals for coupling to a rechargeable battery cell; and g. a microprocessor having a plurality of inputs and outputs;

wherein by way of the plurality of inputs, the microprocessor is capable of sensing:

1. an input voltage across the input terminals;
2. the output voltage of the voltage regulation circuit;
3. a voltage across the voltage regulation circuit;
4. a voltage across the current regulation circuit;
5. a voltage across the means for sensing current; and
6. a voltage across the battery terminals; and wherein the microprocessor calculates a circuit current by dividing the voltage across the means for sensing current by an impedance value of the resistor;

wherein the microprocessor calculates the power dissipation across the voltage regulation circuit by multiplying the voltage across the voltage regulation circuit by the circuit current; and wherein when the power dissipation across the voltage regulation circuit exceeds a predetermined maximum voltage regulation power threshold, the microprocessor actuates a first output coupled to the current regulation circuit, causing the circuit current to decrement by a predetermined amount.

2. The circuit of claim 1, wherein when the power dissipation across the voltage regulation circuit exceeds the maximum voltage regulation power threshold, and the circuit current has been decremented to a predetermined minimum circuit current, the microprocessor causes a circuit selected from the group consisting of the current regulation circuit and the voltage regulation circuit to enter a high impedance state.

3. A battery charging circuit, comprising:

a. input terminals for receiving an input voltage and an input current;

b. an overvoltage protection circuit;

c. a voltage regulation circuit having an output voltage;

d. a current regulation circuit;

e. a means for sensing current flowing through the charging circuit, wherein the means for sensing current comprises a resistor;

f. battery terminals for coupling to a rechargeable battery cell; and g. a microprocessor having a plurality of inputs and outputs;

wherein by way of the plurality of inputs, the microprocessor is capable of sensing:

1. an input voltage across the input terminals;
2. the output voltage of the voltage regulation circuit;
3. a voltage across the voltage regulation circuit;
4. a voltage across the current regulation circuit;
5. a voltage across the means for sensing current; and
6. a voltage across the battery terminals; and wherein the microprocessor calculates a circuit current by dividing the voltage across the means for sensing current by an impedance value of the resistor;

wherein the microprocessor calculates the power dissipation across the current regulation circuit by multiplying the voltage across the current regulation circuit by the circuit current; and wherein when the power dissipation across the current regulation circuit exceeds a predetermined maximum current regulation power threshold, the microprocessor actuates a first output coupled to the current regulation circuit, causing the circuit current to decrement by a predetermined amount.

4. The circuit of claim 3, wherein when the power dissipation across the current regulation circuit exceeds the maximum current regulation power threshold, and the circuit current has been decremented to a predetermined minimum circuit current, the microprocessor causes a circuit selected from the group consisting of the current regulation circuit and the voltage regulation circuit to enter a high impedance state.

* * * * *